US009207723B2

(12) United States Patent
Trivette

(10) Patent No.: US 9,207,723 B2
(45) Date of Patent: Dec. 8, 2015

(54) TELEVISION RECEIVING BOX DOCKING STATION RACK AND SYSTEM

(71) Applicant: Roger Blaine Trivette, Boiling Springs, SC (US)

(72) Inventor: Roger Blaine Trivette, Boiling Springs, SC (US)

(*) Notice: Subject to any disclaimer, the term of this patent is extended or adjusted under 35 U.S.C. 154(b) by 212 days.

(21) Appl. No.: 13/845,459

(22) Filed: Mar. 18, 2013

(65) Prior Publication Data

US 2014/0268531 A1   Sep. 18, 2014

(51) Int. Cl.
*G06F 1/16* (2006.01)
*G06F 1/18* (2006.01)

(52) U.S. Cl.
CPC .............. *G06F 1/183* (2013.01); *G06F 1/1632* (2013.01)

(58) Field of Classification Search
CPC .......... H04B 1/202; H04B 1/20; H04B 17/00; H04B 1/71637; H04B 5/0037; G06F 1/1632; G06F 1/1656; G06F 1/183; G06F 3/0219; G06F 3/0488; G06F 3/0489; G06F 1/1628; G06F 1/163; G06F 1/16; G06F 1/1626; G06F 1/1635; G06F 1/1647; G06F 1/1658; G06F 2200/1635; H04L 43/50; H04L 12/2805; H04H 60/32; H05K 5/0256; H05K 7/1488; H05K 7/20709; H05K 7/1489; H05K 7/1492; H05K 7/20736; H05K 9/0007; H05K 7/1464

USPC ............. 361/679.01, 679.21, 679.26, 679.27, 361/679.41, 724–727, 679.02; 312/223.1–223.2; 174/541; 725/14, 725/107, 111, 151; 710/303–305
See application file for complete search history.

(56) References Cited

U.S. PATENT DOCUMENTS

| | | | |
|---|---|---|---|
| 6,442,030 B1* | 8/2002 | Mammoser et al. | 361/727 |
| 6,741,463 B1* | 5/2004 | Akhtar et al. | 361/679.41 |
| 7,559,659 B2* | 7/2009 | Rhodes et al. | 353/119 |
| 2004/0178270 A1* | 9/2004 | Pradhan et al. | 235/462.13 |
| 2013/0104158 A1* | 4/2013 | Partee | 725/14 |

* cited by examiner

*Primary Examiner* — Anthony Haughton
*Assistant Examiner* — Ingrid Wright
(74) *Attorney, Agent, or Firm* — Southeast IP Group, LLC; Thomas L. Moses

(57) ABSTRACT

A cable box docking station rack includes a frame carrying a series of shelves, and each shelf including a series of docking stations for connection with cable boxes. Each docking station includes a fixed back plate and a slide plate in sliding relation. The back plate includes a series of connectors that correspond with communications ports on the rear portion of a cable box, and after the cable box is placed into the sliding plate, it slides inwardly until the connectors engage the communication and power ports on the cable box. The rack houses a computer system, video monitors, and data entry tools, together with the docking stations, which is used for inspection and diagnostic analysis of cable boxes.

10 Claims, 3 Drawing Sheets

TELEVISION RECEIVING BOX DOCKING STATION RACK AND SYSTEM

BACKGROUND OF THE INVENTION

The present invention relates generally to docking stations for electronic inspection, diagnostics and repair of cable boxes used in conjunction with cable television utilities. More specifically, the present invention includes a rack having a plurality of docking stations that are adapted to receive a plurality of cable boxes, together with a system for checking for malfunctions in each cable box and alerting an operator to potential problems and issues. It should be understood that the term "cable box" may be used herein to refer to any electronic box that is connected to a television, whether the source of the digital signal comes from a cable, satellite, or other type of television signal from a provider.

In recent years, many cable and satellite television companies have begun issuing cable boxes to customers, in order to provide these customers with all of the television channels that are available through the provider. Additionally, these cable boxes are now equipped with additional features, including digital recording capabilities, and are used to facilitate purchases of pay-per-view events, such as sporting events, concerts and movies. These cable boxes, similarly to any other type of high technology systems, are constantly undergoing improvements to features and functionality. As a result of this ever-changing technology, it is common for customers to periodically trade in their older model cable boxes for newer versions. Additionally, when a customer decides to terminate his contract, or declines to renew the cable or satellite television service, he or she typically must bring the cable box back to the company, as these cable boxes are typically owned by the company and leased to the customer.

Due to this constant turnover, it is necessary for these television providers to receive used cable boxes from their customers, and many times, the cable boxes are either refurbished and provided to new customers, or they are upgraded. In either circumstance, the company must test the cable box when it is received back from a customer, in order to ensure that the cable box is in proper working order prior to redistributing it to another customer or providing an upgrade to the existing box. The process of inspecting these cable boxes can be time consuming, and many companies have attempted to design streamlined processes to perform this work. Typically, when a cable box is returned to the company by a customer, a technician must connect the box to a computer or network, using all of the communications ports installed on the cable box, to run diagnostic tests. Such tests are generally performed by running inspection and diagnostic software, to ensure that the cable box is running properly, and further to ensure that all of the ports are communicating properly.

Generally, each cable box includes a series of communications ports, including HDMI ports, standard audio/video jacks, USB ports, fiber optic ports, and coaxial cable ports, among others. Manually connecting cords to each of these ports in order to run inspection and diagnostic software is a slow, time-consuming process. Thus, it would be desirable to provide a diagnostic and inspection system comprising a series of cable box docking stations on a single rack, so that multiple cable boxes may be quickly and easily connected to a computer network for simultaneous testing and diagnostics. Additionally, it would be desirable to provide such a system, wherein each docking station includes an injection-molded back plate having connections corresponding to each digital communications port that is present on the back of a cable box, and a slide plate that receives the cable box in a precise position so that moving the sliding plate and attached cable box towards the back plate aligns the cable box digital communications ports with the corresponding connections on the back plate for a quick and secure connection thereto.

BRIEF SUMMARY OF THE INVENTION

In accordance with one aspect of the invention, a cable box docking station rack and system is provided, wherein a docking station comprises a fixed back plate having a series of connections that correspond with the digital communications ports located on the rear face of a cable box, and a slide plate that receives a cable box for inspection and diagnostics. In use, the cable box is inserted into the slide plate, and then the slide plate is moved toward the back plate, so that the connections on the back plate become engaged with the corresponding communications ports on the back of the cable box. A rack is provided with a series of shelves, and each shelf includes multiple docking stations.

In a preferred embodiment, each connector positioned on the back plate is connected to a series of cords that extend from the connectors to a "smart box," which is then operatively connected to a computer or computer network. The smart box acts as an interface between the computer network and the attached cable boxes. In a preferred embodiment, each shelf includes eight docking stations, and further, a video monitor is dedicated to the series of docking stations on a shelf. Thus, if a rack includes three shelves on a front side, then three monitors may be mounted at the top of the rack, where each monitor shows a display of inspection and diagnostics for a series of docking stations on a single shelf. In a preferred embodiment, a rack will have three shelves and three monitors on a front side, and three shelves and three monitors on a back side. At least one keyboard is connected to the system for data entry and operation of the system, and in a preferred embodiment, two keyboards are used, where one keyboard is positioned on a front side of the rack and one keyboard is positioned on a back side thereof.

During an inspection and diagnostic operation, an operator may insert a series of cable boxes into the docking stations on one shelf and begin running the software operation. It is contemplated that other cable boxes may be added or removed to the docking stations on other shelves while the software is testing the cable boxes on the first shelf. This system allows a single operator to continuously add and remove cable boxes from certain shelves while the software is running on the docked cable boxes positioned on other shelves. The video displays, in a preferred embodiment, indicate the progress of the inspection and diagnostic operation, and then indicate whether each individual cable box is operating in a satisfactory manner, or indicates if there are issues with a particular cable box. Preferably, the video monitor further indicates specific problems associated with each cable box, if any. Once the operation has been completed on a set of cable boxes, they are removed from the rack and separated based on their level of functionality. Ones that are working satisfactorily may be grouped together, while others that are deemed "fixable" may be separated into another group. Cable boxes that have significant issues, which are deemed "irreparable" may be separated into a third group for parts salvage or destruction.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Figure 1:
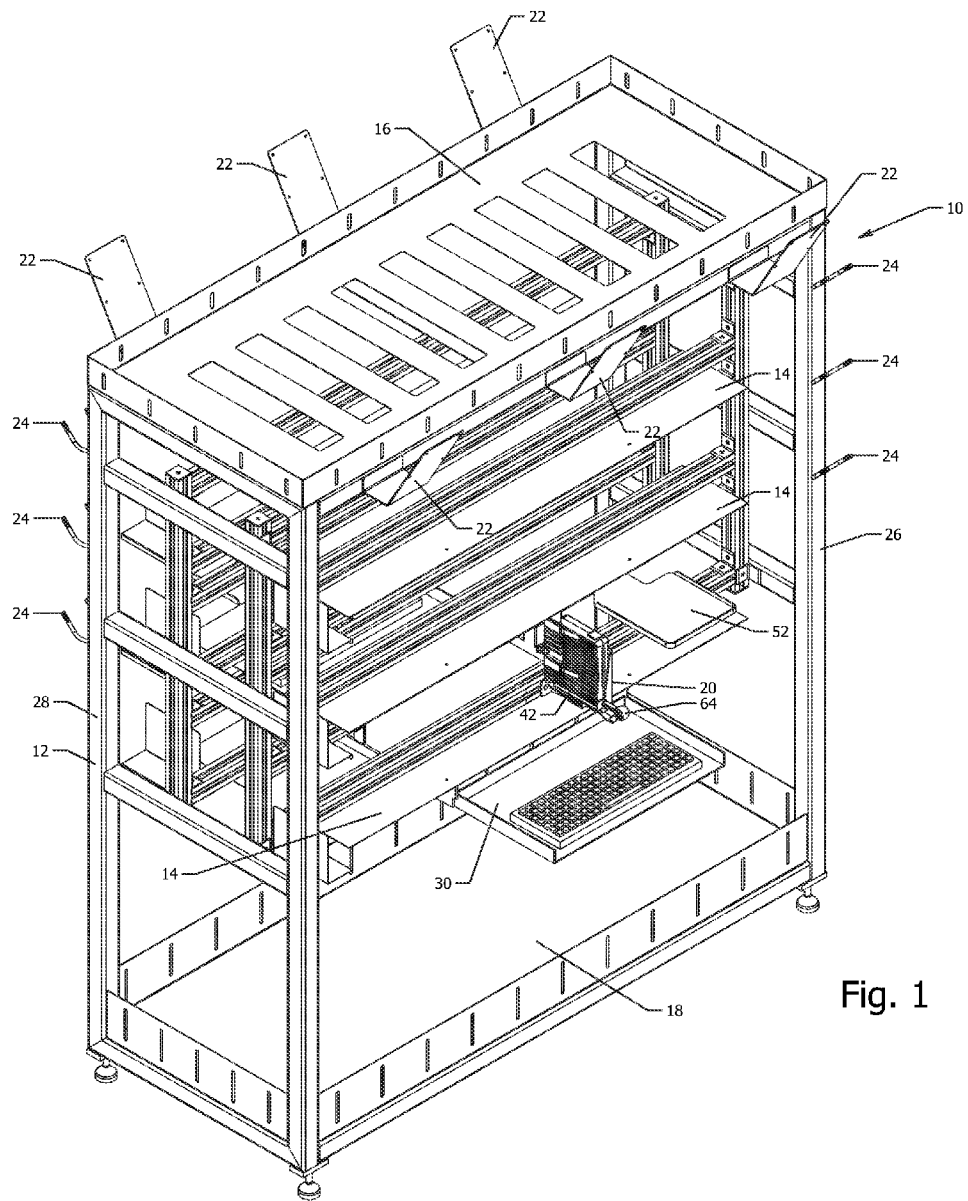
FIG. 1 is an elevated perspective view of a cable box docking station rack system in accordance with one aspect of the present invention.
Figure 2A:
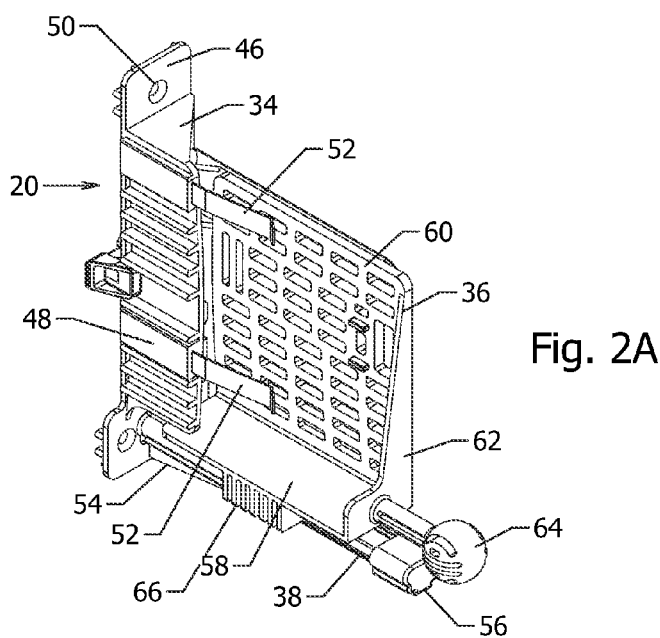
FIG. 2A is an elevated perspective view of a docking station having a back plate and a sliding plate in accordance with one aspect of the present invention.
Figure 2B:
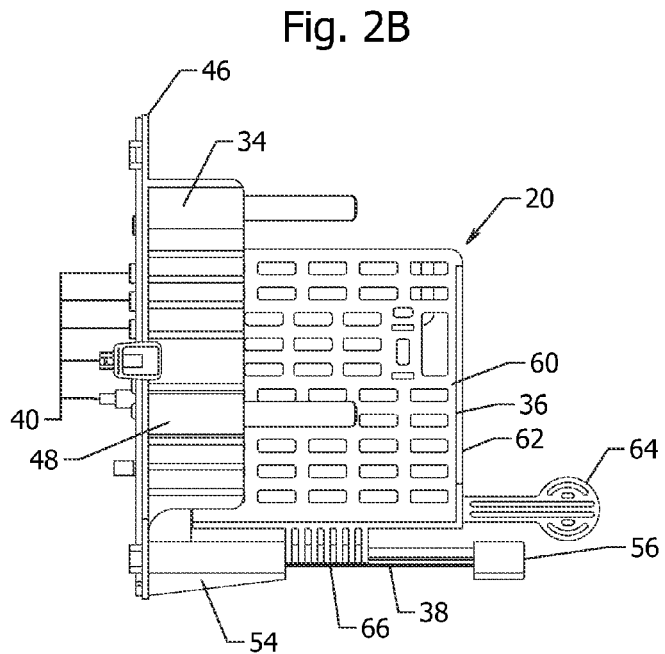
FIG. 2B is a side view of a docking station having a back plate and a sliding plate in accordance with one aspect of the present invention.
Figure 2C:
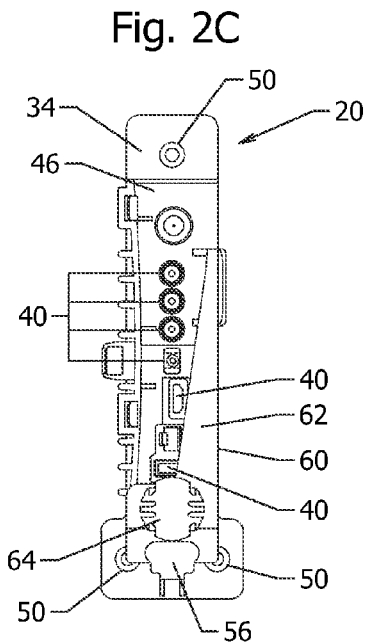
FIG. 2C is a front view of a docking station having a back plate and a sliding plate in accordance with one aspect of the present invention.
Figure 3A:
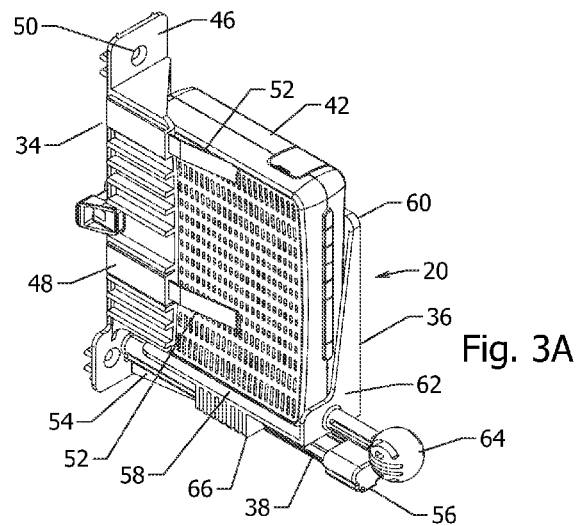
FIG. 3A is an elevated perspective view of a cable box positioned within a docking station having a back plate and a sliding plate in accordance with one aspect of the present invention.
Figure 3B:
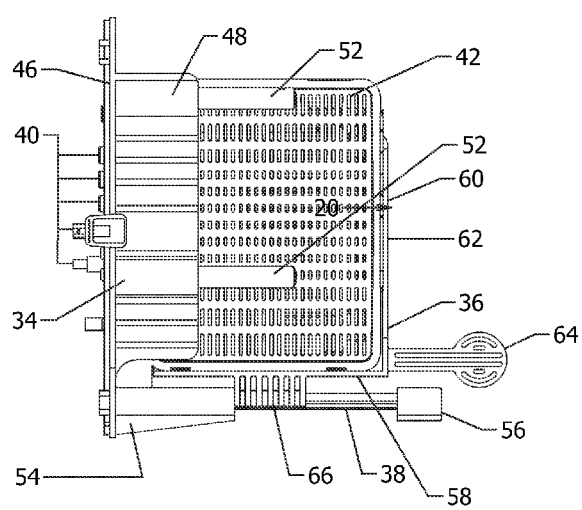
FIG. 3B is a side view of a cable box positioned within a docking station having a back plate and a sliding plate in accordance with one aspect of the present invention.
Figure 3C:
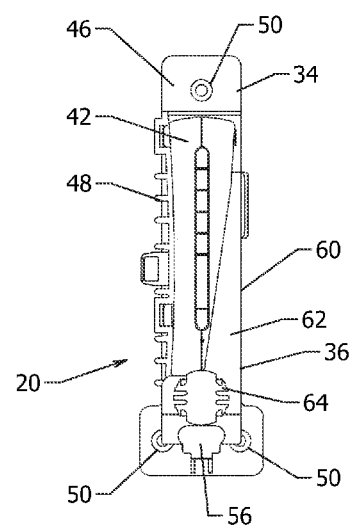
FIG. 3C is a front view of a cable box positioned within a docking station having a back plate and a sliding plate in accordance with one aspect of the present invention.

The present invention includes, in a first embodiment, a cable box docking station rack 10 and system, as shown in FIG. 1. The rack includes a frame member 12 that support a series of shelves 14 on a front side and a backside thereof, as well as a top tray 16 and a bottom tray 18. Each shelf 14 supports a series of docking stations 20 for cable boxes. Multiple video monitor mounts 22 are positioned about the outer periphery of the top tray 16, and hangers 24 are positioned on a front support 26 and a back support 28. The hangers 24 are preferably used to hang a number of barcode readers. A keyboard tray 30 is positioned on the front edge of one shelf 14, and a mouse pad tray 32 is positioned on the front edge of another shelf 14. In a preferred embodiment, there is a keyboard tray 30 and a mouse pad tray 32 similarly situated on a back side of the rack 10, as well.

Each docking station 20 comprises a fixed back plate 34 and a slide plate 36 that is slidably attached to the back plate 34. The slide plate 36 is adapted to slide inwardly and outwardly along a fixed guide rail 38, which is attached and extends outwardly from a bottom portion of the back plate 34. The back plate 34 includes, on a front side thereof, a series of connectors 40 that correspond with communications ports 44 located on the back portion of a cable box 42. On a back side of each back plate 34, cords are connected to the connectors 40, and the cords are operatively connected to the "smart box" interface (not shown), which in turn is operatively connected to a computer or computer network (not shown). The back plate 34 is shaped to correspond with a rear and side portion of a cable box 42, in order to obtain a snug fit when the cable box 42 is situated in the docking station 20. The back plate 34 is generally formed into an L shape, consisting of a base member 46 and a side member 48. The base member 46 includes mounting holes 50, which allow the base member 46 to be mounted to the shelf 14 and/or frame 12 of the rack 10. Optionally, the side member 48 may include a spring 52, as shown, in order to provide additional frictional engagement between the docking station 20 and the cable box 42. The bottom of the back plate 34 includes a guide rail mount 54, which receives a guide rail 38. At the end of the guide rail 38, in a preferred embodiment, is an end stop 56, to prevent the slide plate 36 from sliding off the end of the guide rail 38. The connectors 40 are positioned on the base member 46, and may include an "F" connector, RCA connectors, a Dolby fiber optic connector, an HDMI connector, a telephone connector, a USB connector, a power source connector, and any other connector that corresponds with a communication port or power port on the back of the cable box 42.

The slide plate 36 is also generally L shaped, having a bottom member 58 and a side member 60. A front support 62 is positioned on the front of the slide plate, and a knob 64 extends outwardly from the front support 62. The knob 64 may be used by a worker to slide the slide plate 36 inwardly and outwardly for insertion or removal of a cable box 42. Underneath the bottom member 58 of the slide plate 36 is a slide member 66 that is slidably engaged with the guide rail 38 on the back plate 34. In a preferred embodiment, a slide bearing (not shown) is positioned inside the slide member 66, in order to facilitate smooth operation of the sliding mechanism.

In use, the slide plate 36 is slid outwardly, and a cable box 42 is inserted into the slide plate 36, which is formed to correspond with the dimensions of the cable box 42 to be inserted. The cable box 42 is oriented so that the rear of the cable box 42 faces the fixed back plate 34, and so that the communications ports 44 on the back of the cable box 42 are aligned with the corresponding connectors 40 on the fixed back plate 34. After the cable box 42 is secured into the slide plate 36, the slide plate 36 is pushed rearwardly toward the back plate 34 until the connectors 40 are firmly situated within the communications ports 44 on the back of the cable box 42.

In order to keep track of which cable box 42 is inserted into a specific docking station 20, a bar code reader (not shown) is connected to the computer or computer network, and is used to scan a barcode on each cable box 42. The cable boxes 42, in a preferred embodiment, are loaded into the docking stations 20 in a particular order, so that the system associates the latest barcode read into the system with the next available docking station 20, and preferably senses when each additional cable box 42 is secured to the next available docking station 20.

After a series of cable boxes 42 are situated in operational connection with the docking stations 20, the computer or computer network may be initialized to begin the inspection and diagnostic process. The process may be commenced through use of the keyboard or the mouse, which are connected to the computer or computer network, and the video monitors are used to track the progress and display the results of the inspection and diagnostic tests.

It is contemplated in one embodiment that each shelf 14 of docking stations 20 may be connected to one smart box, one computer and one video monitor, so that each shelf 14 operates as a separate system. Either or both keyboards and computer mice may be used to operate any or all of the docking stations 20, shelves 14, PCs or the entire network. In one embodiment, the individual computers may be positioned on the top tray 16, and the smart boxes may be positioned on the bottom tray 18.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A cable box docking station rack comprising:
   a frame member;
   a series of shelves connected to said frame member;
   a series of docking stations attached to each shelf, each said docking station comprising a back plate and a slide plate, and each docking station adapted to receive and operationally connect to a cable box;
   said back plate having a base member and a side member, wherein said base member and side member come into contact with and support a cable box when said cable box is engaged in said docking station and including a guide rail mount and guide rail extending outwardly from said guide rail mount;
   said base member including means for attachment to said shelf and a series of connectors that correspond with communications and power ports on a rear portion of said cable box; and
   said slide plate adapted to receive said cable box, said slide plate having a bottom member and a side member attached to a front support with a knob extending outwardly therefrom, said slide plate further including a slide member on an underside thereof, wherein said slide member is slidably engaged with said guide rail, so that said slide plate may slide inwardly and outwardly along said slide rail to allow said cable box to become operationally connected to said connectors when said slide plate is slid inwardly, and wherein said cable box may become disconnected from said connectors when said slide plate is slid outwardly.

2. The cable box docking station rack set forth in claim 1, further comprising an upper tray and a lower tray attached to said frame member.

3. The cable box docking station rack set forth in claim 2, further comprising at least one video monitor attached to said upper tray.

4. The cable box docking station rack set forth in claim 1, further comprising at least one keyboard tray attached to one of said shelves.

5. The cable box docking station rack set forth in claim 1, further comprising at least one mouse tray attached to one of said shelves.

6. The cable box docking station rack set forth in claim 1, wherein one set of said shelves are attached to said frame member on a front side thereof and one set of said shelves are attached to said frame member on a rear side thereof.

7. The cable box docking station rack set forth in claim 1, further including a plurality of hangers attached to said frame member.

8. The cable box docking station rack set forth in claim 1, further including an end stop attached to a distal end of said guide rail.

9. The cable box docking station rack set forth in claim 1, wherein said connectors are selected from the group consisting of an "F" connector, RCA connector, a Dolby fiber optic connector, an HDMI connector, a telephone connector, a USB connector, and a power source connector.

10. The cable box docking station rack set forth in claim 1, further including a slide bearing positioned within said slide member.

* * * * *